United States Patent
Skinner

(10) Patent No.: US 9,570,961 B2
(45) Date of Patent: Feb. 14, 2017

(54) ELECTRONIC MOTOR SYSTEM WITH COMMON MODE INDUCTOR

(71) Applicant: Nidec Motor Corporation, St. Louis, MO (US)

(72) Inventor: James L. Skinner, Collinsville, IL (US)

(73) Assignee: Nidec Motor Corporation, St. Louis, MO (US)

( * ) Notice: Subject to any disclaimer, the term of this patent is extended or adjusted under 35 U.S.C. 154(b) by 154 days.

(21) Appl. No.: 14/491,546

(22) Filed: Sep. 19, 2014

(65) Prior Publication Data

US 2016/0087512 A1    Mar. 24, 2016

(51) Int. Cl.
*H02K 11/02* (2016.01)
*H02K 11/04* (2016.01)

(52) U.S. Cl.
CPC ............. *H02K 11/024* (2013.01); *H02K 11/02* (2013.01); *H02K 11/044* (2013.01); *H02K 11/01* (2016.01); *H02K 11/40* (2016.01)

(58) Field of Classification Search
CPC ..... H02K 11/024; H02K 11/02; H02K 11/044; H02K 11/01; H02K 11/40
See application file for complete search history.

(56) References Cited

U.S. PATENT DOCUMENTS

| | | | | |
|---|---|---|---|---|
| 4,080,556 A | * | 3/1978 | Buchwald | H02K 11/044 318/526 |
| 4,959,573 A | * | 9/1990 | Roberts | H02K 17/28 310/68 R |
| 5,986,438 A | * | 11/1999 | Wallace | H02P 9/105 318/821 |
| 2008/0061730 A1 | * | 3/2008 | Shimozono | H02K 11/00 318/812 |
| 2011/0140555 A1 | * | 6/2011 | Nickoladze | H02K 16/04 310/72 |
| 2014/0183995 A1 | * | 7/2014 | Saitou | F04B 35/04 310/72 |

* cited by examiner

*Primary Examiner* — Dang Le
(74) *Attorney, Agent, or Firm* — Hovey Williams LLP

(57) ABSTRACT

An electric motor system has a motor having motor windings and a motor housing. The motor is a variable speed permanent magnet motor configured to drive a load which is part of a residential or commercial machine. A motor control subsystem includes a power module electrically connected to the motor windings. A common mode inductor is electrically interposed between the motor control subsystem and the motor windings so as to present a high impedance obstacle to common mode transients and to reduce an electromagnetic interference effect of an inherent capacitance of each of the motor windings. The common mode inductor is an air core inductor located substantially within the motor housing, and takes the form of additional turns added to the end of each of the motor windings.

19 Claims, 4 Drawing Sheets

ELECTRONIC MOTOR SYSTEM WITH COMMON MODE INDUCTOR

FIELD

The present invention relates to systems and methods for controlling the operation of electric motors.

BACKGROUND

Common mode noise takes the form of high frequency transient spikes that have a path to ground, and may be caused by, e.g., lightning strikes, power outages, and power transitions in other large equipment on the same power line. In electric motor systems, these common mode line transients can cause high currents in motor phase leads which can stress the power module and even cause it to fail. More specifically, during surge and ring wave transients, particularly line to ground transients, the inherent capacitance between the motor windings and the stator can cause high currents to flow in the outputs of a power inverter component of the power module, and these high currents can stress and damage the power output stage.

In larger drives in which the motor controls are not mounted to the electric motors, inductors have been used between the controls and the motors to filter the output power in order to reduce stress on the motors resulting from pulse width modulation edges and to reduce electromagnetic interference (EMI) from the motor leads. However, these inductors are not integrated and therefore require additional space, labor, and cost to install, and are subject to saturation at the high currents levels that occur during transients.

This background discussion is intended to provide information related to the present invention which is not necessarily prior art.

SUMMARY

Embodiments of the present invention solve the above-described and other problems and limitations by providing an electric motor system in which a common mode inductor is interposed between an inverter component of a power module and a plurality of motor windings of an electric motor in order to reduce current spikes and otherwise ameliorate the effects of line transients, and thereby minimize the potential for damage to the power module. Additionally, the resulting isolation of capacitance of the motor windings may reduce the conduction and radiation of EMI during normal operation.

The electric motor system constructed in accordance with an embodiment of the present invention may broadly comprise the electric motor, a motor control subsystem, and the common mode inductor. The electric motor includes the plurality of motor windings and a motor housing, with each motor winding having an inherent capacitance to the motor housing. The motor control subsystem includes the power module electrically connected to the plurality of motor windings. The common mode inductor is electrically interposed between the motor control subsystem and the plurality of motor windings so as to present a high impedance obstacle to common mode transients, wherein the common mode inductor may be an air core inductor located substantially within the motor housing, and may take the form of a plurality of additional turns added to the end of each of the plurality of motor windings.

In various implementations of the first embodiment, the electric motor system may further include any one or more of the following additional features. The electric motor may be a three-phase, multi-pole alternating current variable speed permanent magnet or induction motor. The electric motor may drive a load such as a fan, a pump, a blower, or a rotating drum, which may be part of a residential or commercial machine. The common mode inductor may take the form of approximately between two and six additional turns added to the end of each of the plurality of motor windings. The common mode inductor may reduce the EMI effect of the inherent capacitance of each of the plurality of motor windings.

Additionally, each of these embodiments and implementations may be alternatively characterized as methods based on their functionalities.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

Figure 1:
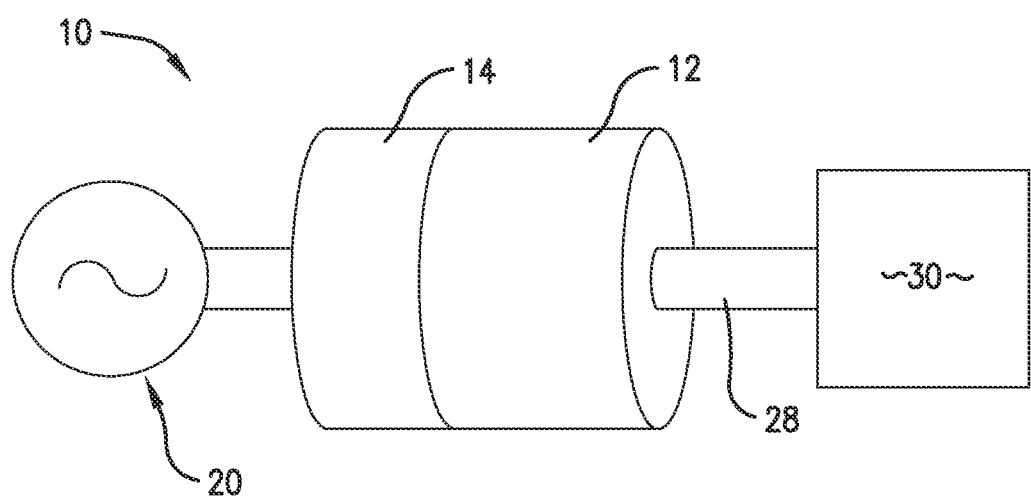
FIG. 1 is a schematic diagram of a first embodiment of an electric motor system constructed in accordance with the present invention.
Figure 3:
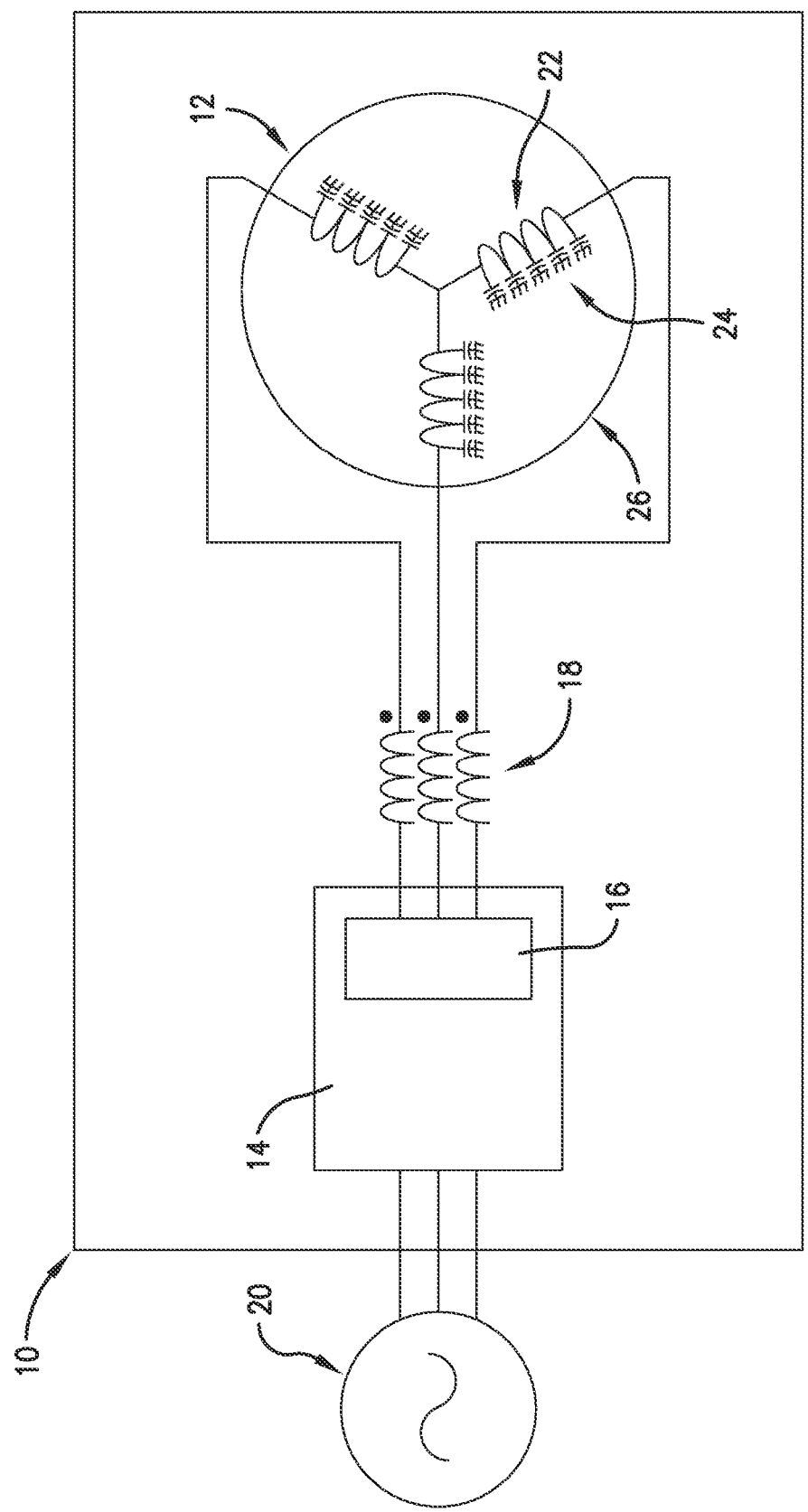
Figure 4:
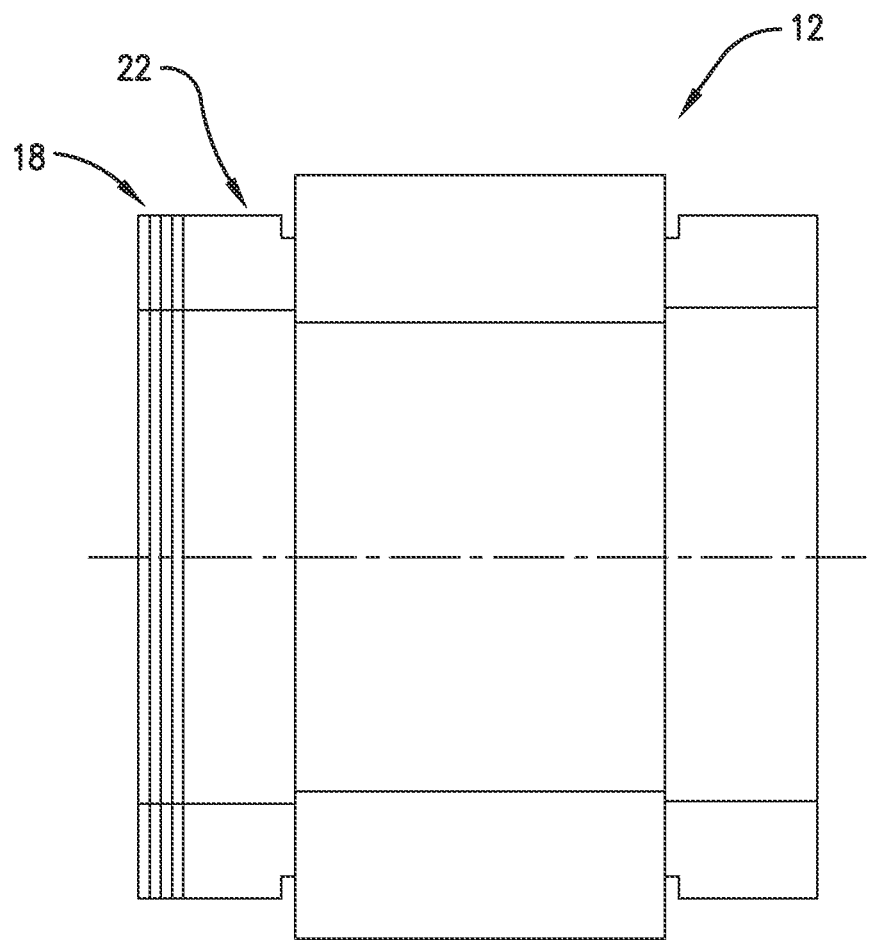

FIG. 3 is a schematic diagram of a second implementation of the common mode inductor component of the electric motor system of FIG. 1; and FIG. 4 is a representation of the common mode inductor component of the electric motor system of FIG. 1, wherein the common mode inductor component is shown as including additional turns added to the end of each of a plurality of windings of a motor winding assembly.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention is an electric motor system in which a common mode inductor is interposed between an inverter component of a power module and a plurality of motor windings of an electric motor in order to reduce current spikes and otherwise ameliorate the effects of line transients, and thereby minimize the potential for damage to the power module. Additionally, the resulting isolation of capacitance of the motor windings may reduce the conduction and radiation of EMI during normal operation.

Referring to the figures, the electric motor system 10 constructed in accordance with the present invention is shown. Referring to FIG. 1, in a first embodiment the electric motor system 10 may broadly include the electric motor 12; a motor control subsystem 14 including the power module 16; and the common mode inductor 18, and may be electrically connected to an alternating current (AC) power source 20.

Figure 2:
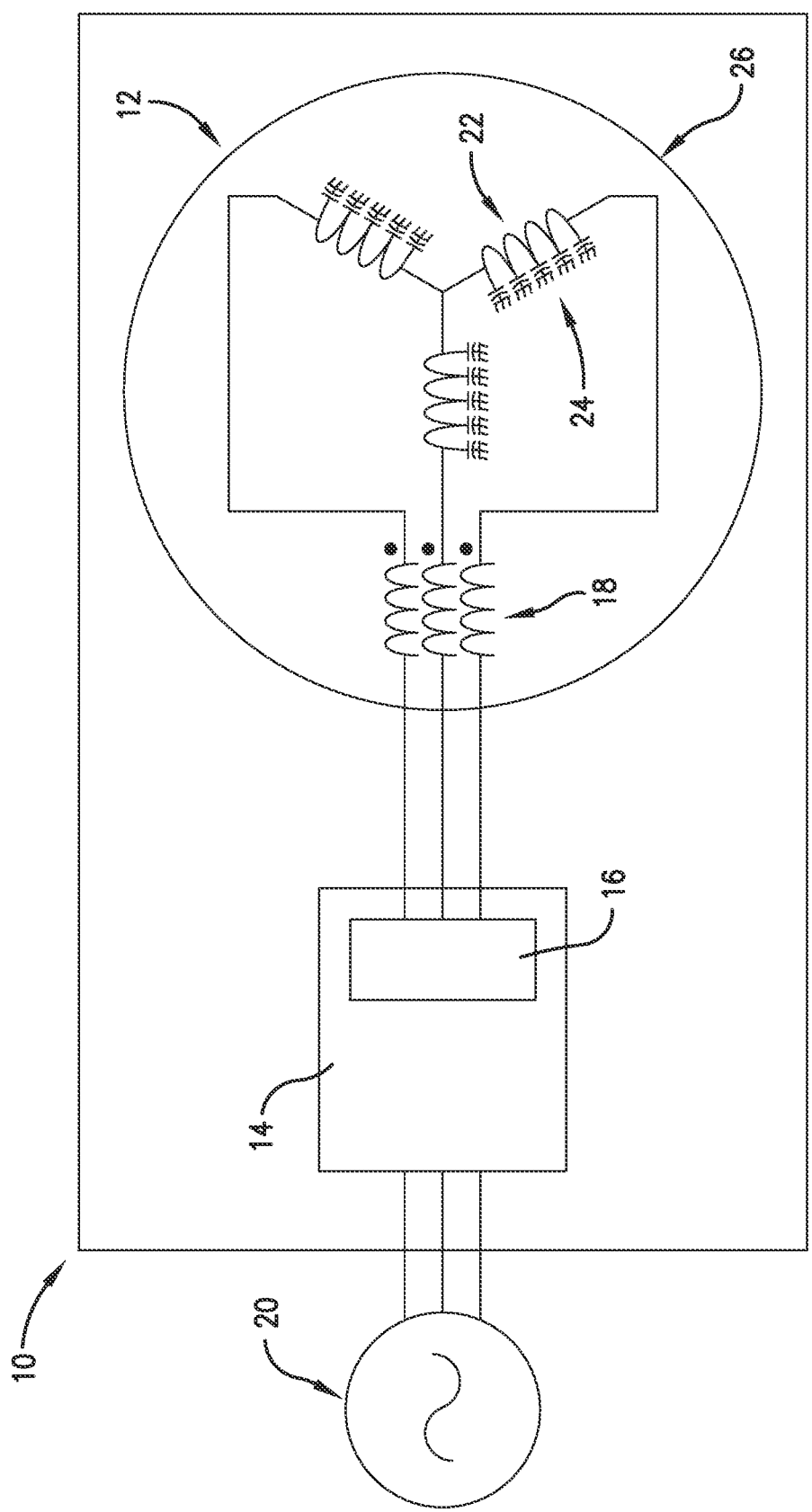
FIG. 2 is a schematic diagram of a first implementation of a common mode inductor component of the electric motor system of FIG. 1.

Referring also to FIGS. 2 and 3, the electric motor 12 may be a variable speed induction motor having a plurality of motor windings 22 that together form a motor winding assembly, wherein each turn of each motor winding 22 exhibits an inherent capacitance 24 to a motor housing 26, or frame, of the electric motor 12. For example, the electric motor 14 may be a three-phase, multi-pole AC permanent magnet or induction motor. The electric motor 12 may include a shaft 28 to facilitate driving any appropriate load 30. For example, the electric motor 12 may drive a fan, a pump, a blower, or a rotating drum, which may be part of a residential or commercial machine, such as a clothes dryer, an oven, or a heating and air-conditioning unit, which may include additional electrical or mechanical components not described herein.

The motor control subsystem 14 may be broadly operable to control operation of the electric motor 12, including during starting and normal operation. In various implementations, the various components of the motor control subsystem 14 may be implemented in hardware and/or software, and may be operable to receive input signals from a user interface and/or one or more sensors and to generate control signals based on such input to control operation of the electric motor 12. The power module 16 component of the motor control subsystem 14 may include a power inverter electrically connected to the motor windings 22 of the electric motor 12.

The common mode inductor 18 may be interposed between the motor windings 22 and the power module 16, and presents a high impedance to any high frequency common mode transients so as to substantially block them. The common mode inductor 18 may include a number of windings equal to the number of motor windings 22. As shown in FIG. 4, the common mode inductor 18 may take the form of approximately between two and six, or approximately four, additional turns added to the end of each of the motor windings 22. In one implementation, the turns of the common mode inductor 18 may be electrically connected to an end of the motor winding assembly. In one implementation, the common mode inductor 18 may be located substantially inside of the motor housing 26, as shown in FIG. 2, which may be both convenient and result in a relatively compact size and low cost. In an alternative implementation, it may be located substantially outside of the motor housing 26, as shown in FIG. 3. The common mode inductor 18 may be an air core inductor, which provides resistance to saturation at very high currents.

Thus, the present invention provides advantages over the prior art, including that it provides the common mode inductor 18 interposed between the power module 16 and the plurality of motor windings 22 in order to reduce current spikes and otherwise ameliorate the effects of line transients, and thereby minimize the potential for damage to the power module 16. Additionally, the resulting isolation of capacitance 24 of the motor windings 22 may reduce the conduction and radiation of EMI during normal operation.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new desired to be protected by Letters Patent includes the following:

1. An electric motor system comprising:
   an electric motor having a plurality of motor windings and a motor housing, with each motor winding having an inherent capacitance to the motor housing;
   a motor control subsystem including a power module electrically connected to the plurality of motor windings; and
   a common mode inductor electrically interposed between the motor control subsystem and the plurality of motor windings so as to present a high impedance obstacle to common mode transients, wherein the common mode inductor is an air core inductor.

2. The electric motor system as set forth in claim 1, wherein the electric motor is a variable speed motor.

3. The electric motor system as set forth in claim 2, wherein the electric motor is a permanent magnet or induction motor.

4. The electric motor system as set forth in claim 3, wherein the electric motor is a three-phase, multi-pole alternating current motor.

5. The electric motor system as set forth in claim 1, wherein the electric motor drives a load selected from the group consisting of: fans, pumps, blowers, and rotating drums.

6. The electric motor as set forth in claim 5, wherein the load is part of a residential or commercial machine.

7. The electric motor system as set forth in claim 1, wherein the common mode inductor takes the form of a plurality of additional turns added to the end of each of the plurality of motor windings.

8. The electric motor system as set forth in claim 7, wherein the common mode inductor takes the form of approximately between two and six additional turns added to the end of each of the plurality of motor windings.

9. The electric motor system as set forth in claim 1, wherein the common mode inductor reduces an electromagnetic interference effect of the inherent capacitance of each of the plurality of motor windings.

10. The electric motor system as set forth in claim 1, wherein the common mode inductor is located inside of the motor housing.

11. An electric motor system comprising:
    an electric motor having a plurality of motor windings and a motor housing, with each motor winding having an inherent capacitance to the motor housing;
    a motor control subsystem including a power module electrically connected to the plurality of motor windings; and
    a common mode inductor electrically interposed between the motor control subsystem and the plurality of motor windings so as to present a high impedance obstacle to common mode transients, wherein the common mode inductor is an air core inductor located substantially within the motor housing, and takes the form of a plurality of additional turns added to the end of each of the plurality of motor windings.

12. The electric motor system as set forth in claim 11, wherein the electric motor is a variable speed motor.

13. The electric motor system as set forth in claim 12, wherein the electric motor is a permanent magnet or induction motor.

14. The electric motor system as set forth in claim 13, wherein the electric motor is a three-phase, multi-pole alternating current motor.

15. The electric motor system as set forth in claim 11, wherein the electric motor drives a load selected from the group consisting of: fans, pumps, blowers, and rotating drums.

16. The electric motor as set forth in claim 15, wherein the load is part of a residential or commercial machine.

17. The electric motor system as set forth in claim 11, wherein the common mode inductor takes the form of approximately between two and six additional turns added to the end of each of the plurality of motor windings.

18. The electric motor system as set forth in claim 11, wherein the common mode inductor reduces an electromagnetic interference effect of the inherent capacitance of each of the plurality of motor windings.

19. An electric motor system comprising:
an electric motor having a motor winding assembly including a plurality of motor windings, and a motor housing, with each motor winding having an inherent capacitance to the motor housing, wherein the electric motor is a three-phase, multi-pole alternating current, variable speed permanent magnet motor configured to drive a load which is part of a residential or commercial machine and selected from the group consisting of: fans, pumps, blowers, and rotating drums;
a motor control subsystem including a power module electrically connected to the plurality of motor windings; and
a common mode inductor electrically interposed between the motor control subsystem and the plurality of motor windings so as to present a high impedance obstacle to common mode transients and to reduce an electromagnetic interference effect of the inherent capacitance of each of the plurality of motor windings, wherein the common mode inductor is an air core inductor located substantially within the motor housing, and takes the form of between two and six additional turns electrically connected to an end of the motor winding assembly.

* * * * *